United States Patent
Lin

(10) Patent No.: US 7,458,256 B1
(45) Date of Patent: Dec. 2, 2008

(54) TIRE PRESSURE MONITORING DEVICE

(75) Inventor: Nan-Shen Lin, Tainan (TW)

(73) Assignee: N.S. - Lin International Co., Ltd., Hsi-Kang Hsiang, Tainan Hsien (TW)

( * ) Notice: Subject to any disclaimer, the term of this patent is extended or adjusted under 35 U.S.C. 154(b) by 0 days.

(21) Appl. No.: 11/901,369

(22) Filed: Sep. 17, 2007

(51) Int. Cl.
*B60C 23/02* (2006.01)
(52) U.S. Cl. .................. 73/146.8; 152/415; 152/417
(58) Field of Classification Search ............. 73/146.8; 152/415, 417
See application file for complete search history.

(56) References Cited

U.S. PATENT DOCUMENTS

| | | | | |
|---|---|---|---|---|
| 4,724,879 A | * | 2/1988 | Schultz et al. | 152/416 |
| 4,895,199 A | * | 1/1990 | Magnuson et al. | 152/415 |
| 4,932,451 A | * | 6/1990 | Williams et al. | 152/417 |
| 6,357,469 B1 | * | 3/2002 | Bell | 137/224 |
| 6,550,511 B2 | * | 4/2003 | Nienhaus | 152/415 |
| 2005/0133134 A1 | * | 6/2005 | Ingram et al. | 152/417 |
| 2005/0257872 A1 | * | 11/2005 | Szykulski | 152/417 |
| 2006/0005908 A1 | * | 1/2006 | Ingram | 152/417 |
| 2008/0149244 A1 | * | 6/2008 | Liao | 152/427 |

* cited by examiner

*Primary Examiner*—Andre J Allen
(74) *Attorney, Agent, or Firm*—Merchant & Gould P.C.

(57) ABSTRACT

A tire pressure monitoring device includes a housing unit, a tire inflating unit, and a tire pressure monitoring unit. The housing unit includes: a tubular body confining an air chamber; a tire coupling seat adapted to couple the tubular body to a tire such that the air chamber is in fluid communication with an interior of the tire; and a cap body formed with an outwardly extending annular flange to engage a retainer part of the tubular body. The tire inflating unit includes an inflating tube connected at one end to the tubular body and in fluid communication with the air chamber, and an inflating valve. The tire pressure monitoring unit is disposed in the tubular body and is covered by the cap body.

15 Claims, 4 Drawing Sheets

TIRE PRESSURE MONITORING DEVICE

BACKGROUND OF THE INVENTION

1. Field of the Invention

The invention relates to a tire pressure monitoring device, more particularly to a tire pressure monitoring device including a power source and capable of wireless transmission of detected tire pressure information.

2. Description of the Related Art

Referring to FIG. 1, a conventional tire pressure monitoring device 1 is adapted to be connected to a tire valve (not shown) and includes a housing unit 11 and a tire pressure monitoring unit 12. The housing unit 11 has an upper housing part 111 that is connected to and that cooperates with a lower housing part 112 to confine an air chamber 113. The upper housing part 111 is provided with an air inlet 114 in spatial communication with the air chamber 113, and an inflating valve unit 115. A guide tube 116 connects the air inlet 114 to the tire valve. The tire can be inflated or deflated through the inflating valve unit 115. The lower housing part 112 is mounted onto the tire (not shown). The tire pressure monitoring unit 12 has a power source 121 (such as a lithium battery) mounted on the lower housing part 112, a circuit board 122 positioned between the upper and lower housing parts 111, 112 and to be connected electrically to the power source 121, and an operating module 123 mounted on the circuit board 122 and having tire pressure and temperature monitoring as well as radio frequency transmission functionalities. When the upper and lower housing parts 111, 112 are coupled together, the circuit board 122 and the power source 121 are connected electrically, and the operating module 123 begins to function so that conditions (e.g., pressure and temperature) in the tire are detected and are transmitted wirelessly to a display in a passenger room of a vehicle in order for the vehicle driver to be aware of the tire condition, thereby enhancing driving safety.

In the conventional tire pressure monitoring device 1, the upper and lower housing parts 111, 112 are coupled threadedly together to facilitate replacement of the power source 121. Replacement of the power source 121 requires disconnection of the guide tube 116 from the air inlet 114 before the upper housing part 111 can be unscrewed from the lower housing part 112, which is inconvenient to conduct. In addition, vibrations as a result of road travel can loosen the connection between the upper and lower housing parts 111, 112, thereby leading to connection failure between the circuit board 122 and the power source 121 and thereby resulting in possible air leakage from the air chamber 113. Hence, the design of the conventional tire pressure monitoring device 1 has poor reliability and instability issues.

SUMMARY OF THE INVENTION

Therefore, it is an object of the present invention to provide a tire pressure monitoring device that can overcome the above drawbacks of the prior art.

According to the present invention, a tire pressure monitoring device includes a housing unit, a tire inflating unit, and a tire pressure monitoring unit. The housing unit includes: a tubular body that confines an air chamber and that has first and second portions; a tire coupling seat that is adapted to couple the first portion of the tubular body to a tire such that the air chamber is in fluid communication with an interior of the tire; and a cap body that is disposed at the second portion of the tubular body and that is formed with an outwardly extending annular flange. The second portion of the tubular body is formed with a retainer part that engages the annular flange to prevent removal of the cap body from the tubular body. The tire inflating unit includes an inflating tube connected at one end to the tubular body and in fluid communication with the air chamber, and an inflating valve disposed in the inflating tube. The tire pressure monitoring unit is disposed in the second portion of the tubular body and is covered by the cap body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
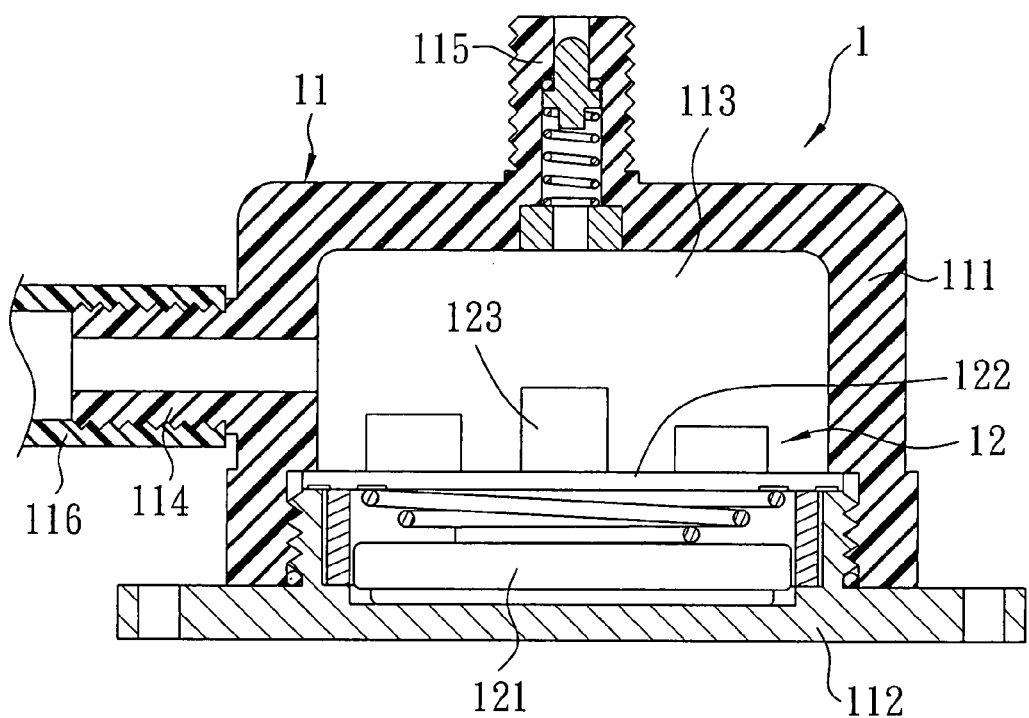
FIG. 1 is a partly sectional view of a conventional tire pressure monitoring device.

Before the present invention is described in greater detail, it should be noted herein that like elements are denoted by the same reference numerals throughout the disclosure.

Figure 2:
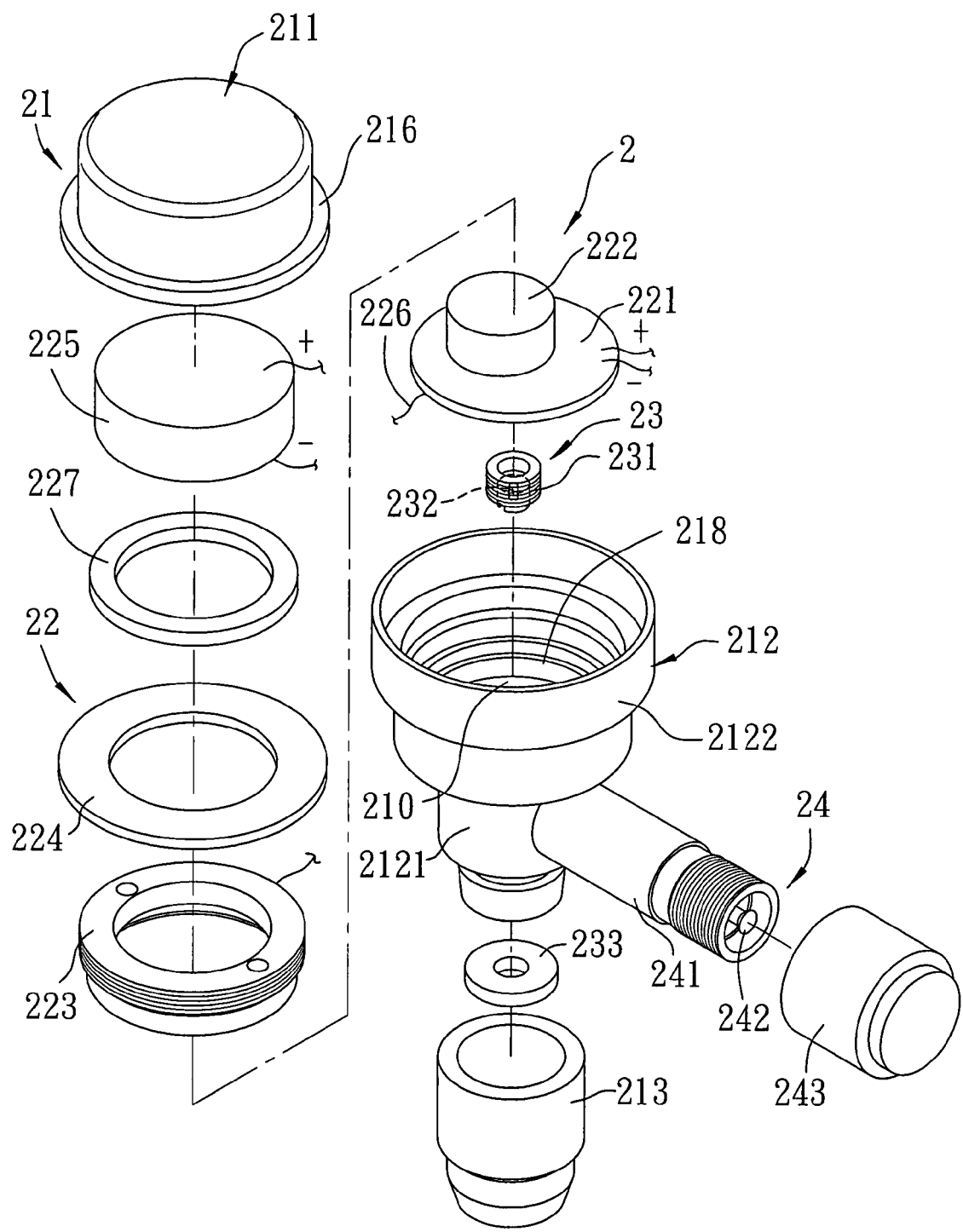
FIG. 2 is an exploded perspective view of the first preferred embodiment of a tire pressure monitoring device according to the present invention.
Figure 3:
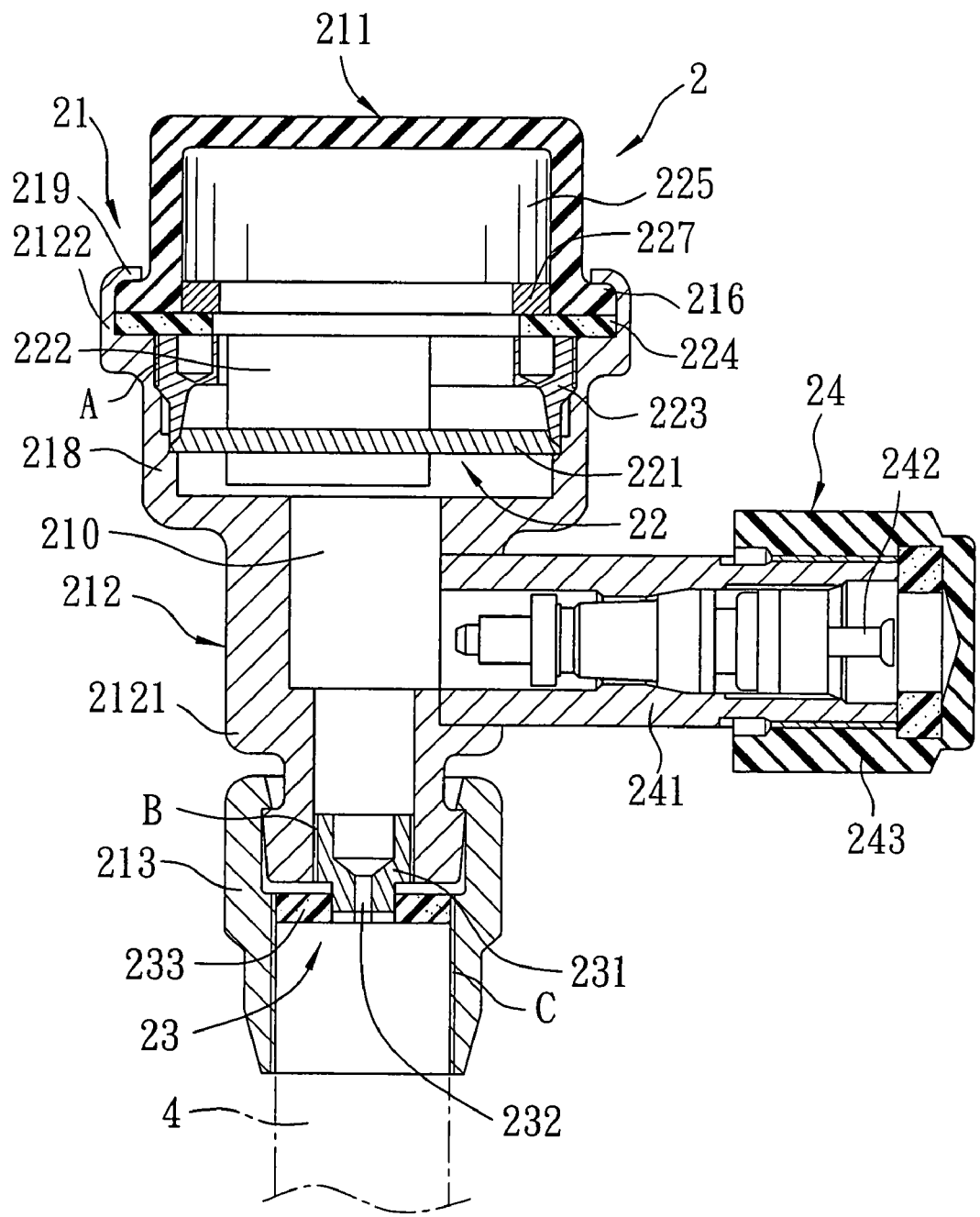
FIG. 3 is a partly sectional view of the first preferred embodiment.

Referring to FIGS. 2 and 3, the first preferred embodiment of a tire pressure monitoring device 2 according to the present invention is installed directly on a tire valve 4 and is used together with a display in a passenger room of a vehicle to enable a vehicle driver to monitor tire conditions.

The tire pressure monitoring device 2 of this embodiment includes a housing unit 21, a tire inflating unit 24, and a tire pressure monitoring unit 22.

The housing unit 21 includes: a tubular body 212 that confines an air chamber 210 and that has first and second portions 2121, 2122; a tire coupling seat 213 that is adapted to couple the first portion 2121 of the tubular body 212 to a tire (not shown) such that the air chamber 210 is in fluid communication with an interior of the tire through the tire valve 4; and a cap body 211 that is disposed at the second portion 2122 of the tubular body 212 and that is formed with an outwardly extending annular flange 216. The second portion 2122 of the tubular body 212 is bent to form a retainer part 219 that engages the annular flange 216 to prevent removal of the cap body 211 from the tubular body 212. In this embodiment, the tire coupling seat 213 is connected rotatably to the first portion 2121 of the tubular body 212 and is formed with an internal screw thread (C) for coupling threadedly with the tire valve 4. The tubular body 212 is made of metal. The cap body 211 is made of an insulator material. The second portion 2122 of the tubular body 212 is further formed with a limiting portion 218 that projects inwardly.

The tire inflating unit 24 includes an inflating tube 241 connected at one end to the tubular body 212 and in fluid communication with the air chamber 210, an inflating valve 242 disposed in the inflating tube 241, and a tube cap 243 to cover removably the end of the inflating tube 241. Since the design of the inflating valve 242 is similar to that of a conventional tire valve, further details of the same are omitted herein for the sake of brevity.

The tire pressure monitoring 22 is disposed in the second portion 2122 of the tubular body 212 and is covered by the cap body 211. The tire pressure monitoring unit 22 includes a circuit board 221 having one side abutting against the limiting portion 218, an operating module 222 mounted on the circuit board 221 and having tire pressure detection and radio frequency transmission functionalities, and a power source 225 (such as a lithium battery) disposed in the cap body 211 and coupled electrically to the circuit board 221. The tire pressure monitoring unit 22 further includes a locking ring 223 engaging threadedly an internal screw thread (A) formed on the second portion 2122 of the tubular body 212 for urging the circuit board 221 toward the limiting portion 218, a conductor unit 226 that interconnects electrically the locking ring 223 and the circuit board 221, a seal ring 224 that is disposed between the locking ring 223 and the annular flange 216 of the cap body 211, and a structural ring 227 that is disposed in the cap body 211 between the seal ring 224 and the power source 225, that structural ring 227 is made of metal, and that is substantially flush with the annular flange 216 of the cap body 211. In view of the electrical connection between the circuit board 221 and the tubular body 212, which is made of metal, the tubular body 212 can serve as an antenna to enable efficient signal transmission by the operating module 222.

The tire pressure monitoring device 2 further includes a tire valve actuator 23. The tire valve actuator 23 includes an actuating block 231 engaging threadedly an internal screw thread (B) formed on the first portion 2121 of the tubular body 212 and formed with an air channel 232, and a seal member 233 disposed between the actuating block 231 and the tire coupling seat 213. The actuating block 231 can open the tire valve 4 to permit air flow between the interior of the tire and the air chamber 210.

In use, the operating module 222 of the tire pressure monitoring unit 22 detects tire pressure and transmits detected information wirelessly for receipt by the display in the passenger room of the vehicle. In addition, when tire pressure is inadequate, the tire can be inflated directly through the tire inflating unit 24.

During assembly of the tire pressure monitoring device 2, the actuating block 231 is first connected to the first portion 2121 of the tubular body 212. The circuit board 221 (which has the operating module 222 disposed thereon) is then seated on the limiting portion 218 of the second portion 2122 of the tubular body 212, and the locking ring 223 is subsequently secured to the second portion 2122 of the tubular body 212 to fix the position of the circuit board 221. The seal ring 224, the structural ring 227, the power source 225 and the cap body 211 are then disposed in sequence above the locking ring 223, and the second portion 2122 of the tubular body 212 is bent to form the retainer part 219 that engages intimately the annular flange 216 of the cap body 211. The structural ring 227 in the cap body 211 serves to reinforce the structure of the cap body 211 to prevent undesired deformation when the retainer part 219 is formed to engage the annular flange 216 (see FIG. 3). The cap body 211 is connected non-removably to the tubular body 212 at this time. Finally, the seal member 233 is disposed on the actuating block 231, and the tire coupling seat 213 is coupled rotatably to the first portion 2121 of the tubular body 212 to complete assembly of the tire pressure monitoring device 2.

Due to the locking ring 223 that fixes the position of the circuit board 221 in the tubular body 212, and to the retainer part 219 that fixes the cap body 211 and the power source 225 to the tubular body 212, electrical connection among the power source 225, the circuit board 221 and the operating module 222 can be ensured so that reliable and stable operation of the tire pressure monitoring device 2 is maintained even when a tire is traveling at a fast speed. In addition, installation of the tire pressure monitoring device 2 of this invention is convenient since it is only required to connect the tire coupling seat 213 to the tire valve 4.

In this invention, the power source 225 is designed to have a capacity that would permit operation of the tire pressure monitoring device 2 for a period of about five years without requiring replacement of the power source 225. Should there be a need to replace the power source 225, the tire pressure monitoring device 2 can be sent back to the manufacturer or supplier for replacement. By breaking the tubular body 212, components of the tire pressure monitoring unit 22 can be recycled for making a new tire pressure monitoring device 2 with a fresh power source 225.

Figure 4:
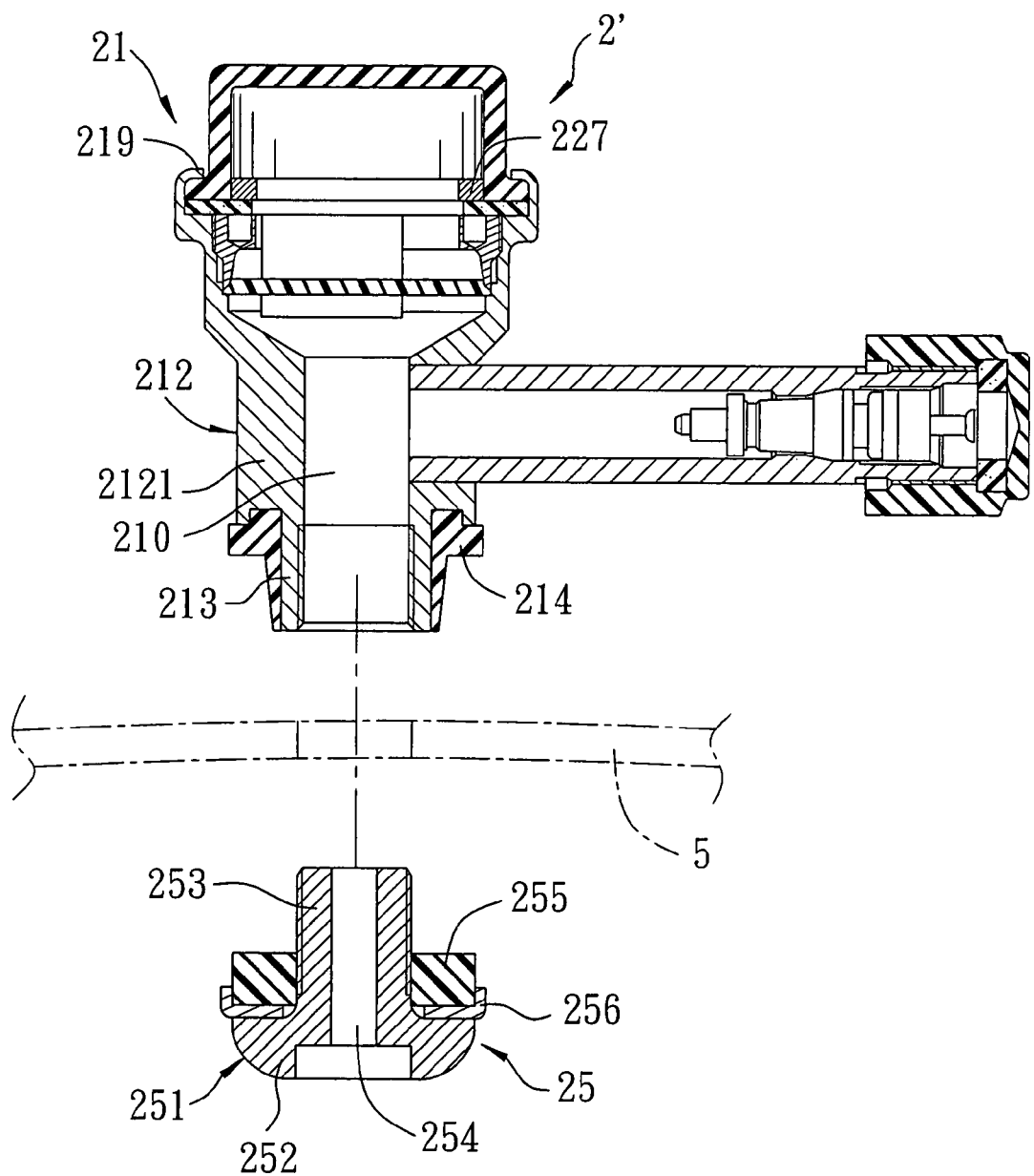
FIG. 4 is an exploded partly sectional view of the second preferred embodiment of a tire pressure monitoring device according to the present invention.

FIG. 4 illustrates the second preferred embodiment of a tire pressure monitoring device 2' according to the present invention, which uses an anchor member 25 instead of the tire valve actuator 23 of the previous embodiment. The tire valve actuator 23 of the previous embodiment is to be connected to the tire valve 4, whereas the anchor member 25 of this embodiment is to be installed inside a tire 5. The anchor member 25 includes an anchor body 251 having a large cross-section segment 252 and a small cross-section segment 253 extending from the large cross-section segment 252 and extending out of the tire 5 to connect threadedly with the tire coupling seat 213. The anchor body 251 is formed with an air passage 254 that extends from the large cross-section segment 252 through the small cross-section segment 253 and that permits air flow between the interior of the tire 5 and the air chamber 210. The anchor member 25 further includes a gasket 255 sleeved on the small cross-section segment 253, and a washer 256 sleeved on the small cross-section segment 253 and disposed between the large cross-section segment 252 and the gasket 255. In this embodiment, the gasket 255 is made of rubber, and the washer 256 is made of metal.

In this embodiment, the housing unit 21 further includes a rubber sleeve 214 disposed around the tire coupling seat 213, which extends integrally from the first portion 2121 of the tubular body 212.

The tire pressure monitoring device 2' of this embodiment can similarly attain the aforementioned advantages of the previous embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A tire pressure monitoring device comprising:
   a housing unit including
      a tubular body that confines an air chamber and that has first and second portions,
      a tire coupling seat that is adapted to couple said first portion of said tubular body to a tire such that said air chamber is in fluid communication with an interior of the tire, and
      a cap body that is disposed at said second portion of said tubular body, said cap body being formed with an outwardly extending annular flange,
      said second portion of said tubular body being formed with a retainer part that engages said annular flange to prevent removal of said cap body from said tubular body;

a tire inflating unit including an inflating tube connected at one end to said tubular body and in fluid communication with said air chamber, and an inflating valve disposed in said inflating tube; and a tire pressure monitoring unit disposed in said second portion of said tubular body and covered by said cap body.

2. The tire pressure monitoring device as claimed in claim 1, further comprising a tire valve actuator including an actuating block mounted in said first portion of said tubular body and formed with an air channel that permits air flow between the interior of the tire and said air chamber, and a seal member disposed between said actuating block and said tire coupling seat.

3. The tire pressure monitoring device as claimed in claim 2, wherein said actuating block is connected threadedly to said first portion of said tubular body.

4. The tire pressure monitoring device as claimed in claim 3, wherein said tire coupling seat is connected rotatably to said first portion of said tubular body and is formed with an internal screw thread.

5. The tire pressure monitoring device as claimed in claim 4, wherein said tire pressure monitoring unit includes a circuit board, an operating module mounted on said circuit board and having tire pressure detection and radio frequency transmission functionalities, and a power source disposed in said cap body and coupled electrically to said circuit board.

6. The tire pressure monitoring device as claimed in claim 5, wherein:
said second portion of said tubular body is formed with a limiting portion that projects inwardly;
said circuit board having one side abutting against said limiting portion;
said tire pressure monitoring unit further including a locking ring secured to said second portion of said tubular body for urging said circuit board toward said limiting portion, a conductor unit that interconnects electrically said locking ring and said circuit board, and a seal ring that is disposed between said locking ring and said annular flange of said cap body.

7. The tire pressure monitoring device as claimed in claim 6, wherein said tubular body is made of metal and serves as an antenna for said tire pressure monitoring unit.

8. The tire pressure monitoring device as claimed in claim 7, wherein said cap body is made of an insulator material.

9. The tire pressure monitoring device as claimed in claim 8, wherein said tire pressure monitoring unit further includes a structural ring that is disposed in said cap body between said seal ring and said power source and that is substantially flush with said annular flange of said cap body.

10. The tire pressure monitoring device as claimed in claim 1, further comprising an anchor member including an anchor body having a large cross-section segment and a small cross-section segment extending from said large cross-section segment and connected to said tire coupling seat, said anchor body being formed with an air passage that extends from said large cross-section segment through said small cross-section segment, said anchor member further including a gasket sleeved on said small cross-section segment, and a washer sleeved on said small cross-section segment and disposed between said large cross-section segment and said gasket.

11. The tire pressure monitoring device as claimed in claim 10, wherein said small cross-section segment of said anchor body is connected threadedly to said tire coupling seat.

12. The tire pressure monitoring device as claimed in claim 11, wherein said tire pressure monitoring unit includes a circuit board, an operating module mounted on said circuit board and having tire pressure detection and radio frequency transmission functionalities, and a power source disposed in said cap body and coupled electrically to said circuit board.

13. The tire pressure monitoring device as claimed in claim 12, wherein:
said second portion of said tubular body is formed with a limiting portion that projects inwardly;
said circuit board having one side abutting against said limiting portion;
said tire pressure monitoring unit further including a locking ring secured to said second portion of said tubular body for urging said circuit board toward said limiting portion, a conductor unit that interconnects electrically said locking ring and said circuit board, and a seal ring that is disposed between said locking ring and said annular flange of said cap body.

14. The tire pressure monitoring device as claimed in claim 13, wherein said housing unit further includes a sleeve disposed around said tire coupling seat.

15. The tire pressure monitoring device as claimed in claim 14, wherein said tire coupling seat extends integrally from said first portion of said tubular body.

* * * * *